US010661677B2

(12) United States Patent
Rozman et al.

(10) Patent No.: US 10,661,677 B2
(45) Date of Patent: May 26, 2020

(54) ELECTRICAL POWER SYSTEM FOR HYBRID OR ELECTRIC VEHICLE

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 192 days.

(21) Appl. No.: 15/658,845

(22) Filed: Jul. 25, 2017

(65) Prior Publication Data
US 2019/0031041 A1 Jan. 31, 2019

(51) Int. Cl.
*H02J 7/00* (2006.01)
*H02J 7/14* (2006.01)
*B60L 58/10* (2019.01)
*H02M 7/217* (2006.01)
*B60L 50/12* (2019.01)
*B60L 53/24* (2019.01)

(52) U.S. Cl.
CPC .............. *B60L 58/10* (2019.02); *B60L 50/12* (2019.02); *B60L 53/24* (2019.02); *H02J 7/0027* (2013.01); *H02M 7/2176* (2013.01); *B60L 2220/54* (2013.01); *B60L 2220/56* (2013.01)

(58) Field of Classification Search
USPC ......................... 320/107, 101, 134, 136, 104
See application file for complete search history.

(56) References Cited

U.S. PATENT DOCUMENTS

| 5,343,971 | A | 9/1994 | Heidelberg et al. |
| 7,406,370 | B2 | 7/2008 | Kojori et al. |
| 7,439,634 | B2 | 10/2008 | Michalko |
| 8,378,641 | B2 | 2/2013 | Rozman et al. |
| 8,427,116 | B2 | 4/2013 | Rozman et al. |
| 9,077,237 | B2 | 7/2015 | Ganev et al. |
| 2006/0061213 | A1 | 3/2006 | Michalko |

(Continued)

FOREIGN PATENT DOCUMENTS

KR 20120124815 A 11/2012

OTHER PUBLICATIONS

European Search Report for European Application No. 18185588.3, completed Jan. 3, 2019.

*Primary Examiner* — Alexis B Pacheco
(74) *Attorney, Agent, or Firm* — Carlson, Gaskey & Olds, P.C.

(57) ABSTRACT

An example vehicle electrical power system includes a battery operable to power a load of a vehicle over a direct current (DC) bus, a multiphase alternating current (AC) machine comprising a plurality of windings, and a power converter. The power converter includes a plurality of power switches and a controller. The controller is configured to, in a first mode, operate the power converter as an active rectifier that provides current to the DC bus to supply DC loads, and charge the battery from the current on the DC bus; and in a second mode, operate the power converter as a boost converter that converts a variable output voltage of the battery to a constant voltage on the DC bus. The power converter utilizes the plurality of windings when operated as an active rectifier and boost converter. A method of operating a vehicle electrical power system is also disclosed.

20 Claims, 4 Drawing Sheets

(56) References Cited

U.S. PATENT DOCUMENTS

| | | | |
|---|---|---|---|
| 2010/0080030 A1* | 4/2010 | Wiegman | H02J 4/00 |
| | | | 363/131 |
| 2011/0012543 A1* | 1/2011 | Takizawa | B60L 3/003 |
| | | | 318/139 |
| 2012/0007428 A1 | 1/2012 | Rozman et al. | |
| 2013/0002186 A1* | 1/2013 | Iwahori | B60L 15/007 |
| | | | 318/722 |
| 2013/0293192 A1* | 11/2013 | Abe | B60L 11/182 |
| | | | 320/108 |
| 2014/0184172 A1* | 7/2014 | Momo | H02J 7/0057 |
| | | | 320/160 |
| 2014/0354195 A1* | 12/2014 | Li | H02J 7/0036 |
| | | | 318/139 |
| 2015/0061580 A1* | 3/2015 | Yamakawa | H01M 10/44 |
| | | | 320/108 |
| 2015/0175008 A1* | 6/2015 | Honda | B60L 3/00 |
| | | | 701/22 |
| 2015/0231978 A1 | 8/2015 | Danner | |
| 2015/0372494 A1* | 12/2015 | Wakabayashi | H02J 5/005 |
| | | | 307/104 |
| 2016/0280080 A1* | 9/2016 | Takei | B60L 11/1811 |
| 2017/0149368 A1* | 5/2017 | Pietromonaco | H02P 25/092 |

* cited by examiner

ELECTRICAL POWER SYSTEM FOR HYBRID OR ELECTRIC VEHICLE

BACKGROUND

The present disclosure relates to electrical power systems, and more particularly to an electrical power system for a hybrid or electric vehicle.

Hybrid vehicles incorporate a rechargeable battery that is used to power one or more traction drive motors to move the vehicle at low speeds. At higher speeds and/or during certain acceleration conditions, an additional "prime mover" internal combustion engine is used to move the vehicle. The battery of a hybrid typically charges from regenerative breaking, which uses vehicle kinetic energy to generate current for charging the battery.

Similarly, range-extended electric vehicles, which are run exclusively on battery power under certain conditions, may include a prime mover engine to charge the vehicle battery once its charge is depleted.

Hybrid and electric vehicles have required a dedicated boost converter to increase the vehicle battery voltage to power a pulse load.

SUMMARY

An example vehicle electrical power system includes a battery operable to power a load of a vehicle over a direct current (DC) bus, and a multiphase alternating current (AC) machine comprising a plurality of windings (e.g., stator windings), and a power converter. The power converter includes a plurality of power switches and a controller. The controller is configured to, in a first mode, operate the power converter as an active rectifier that provides current to the DC bus to supply DC loads, and charge the battery from the current on the DC bus; and in a second mode, operate the power converter as a boost converter that converts a variable voltage of the battery to a constant voltage on the DC bus. The power converter utilizes the plurality of windings of the AC machine when operated as active rectifier and boost converter.

A method of operating a vehicle electrical power system is also disclosed.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
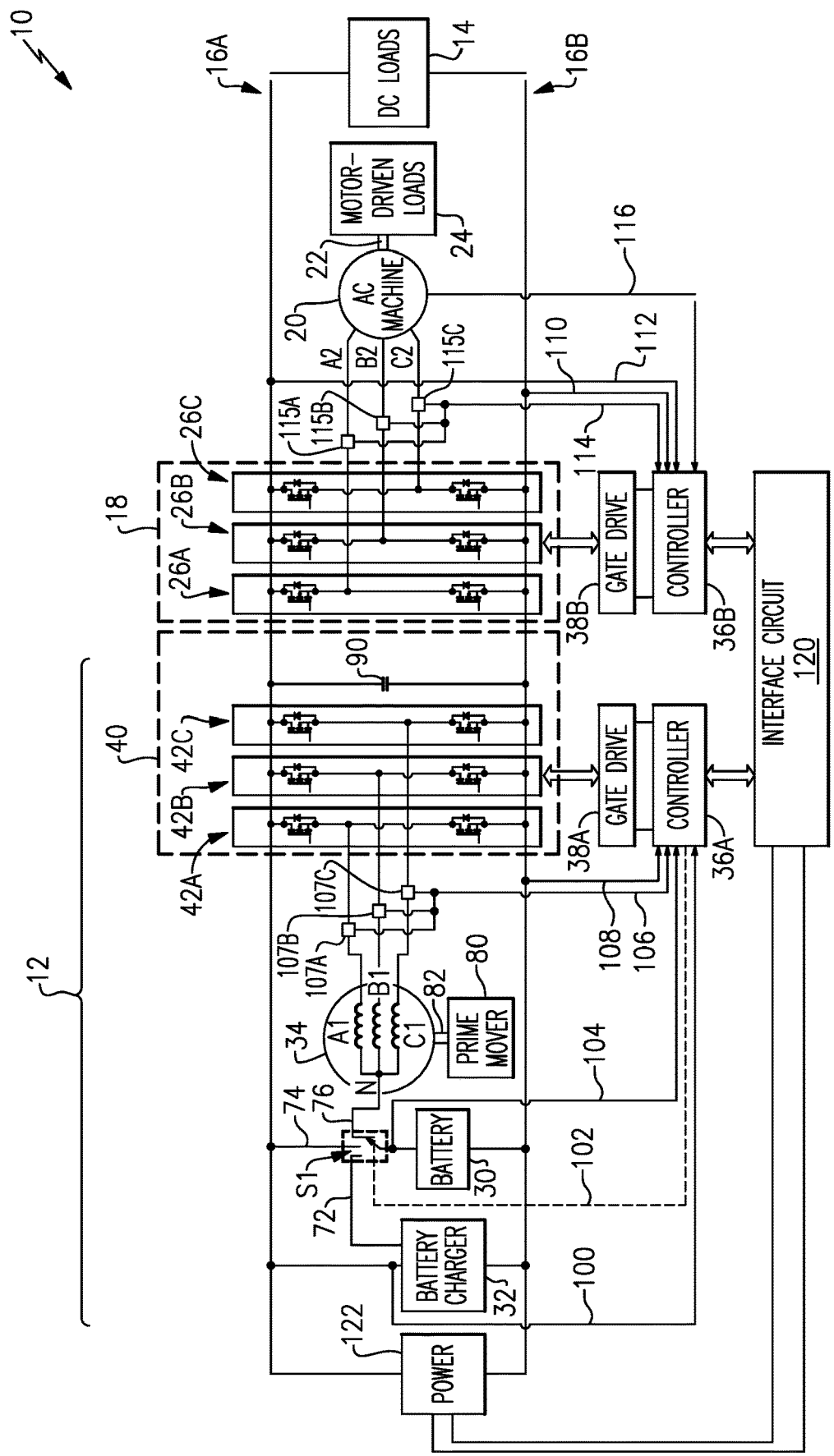
FIG. 1 is a schematic view of an example electrical power system for a vehicle.

FIG. 1 schematically illustrates an example electrical power system 10 for a vehicle, such as an electric or hybrid military ground or underwater vehicle, that includes a power generating section 12 and a plurality of DC loads 14. The power generating section 12 powers the plurality of DC loads 14 over a DC bus that includes a positive rail 16A and a negative rail 16B, collectively referred to herein as DC bus 16.

The DC loads 14 include at least one base load and at least one pulse (dynamic) load. The at least one base load tends to have a more constant power usage, and may include items such as an export inverter (e.g., for plugging in an alternating current (AC) appliance in a vehicle), or a vehicle HVAC system, for example. The at least one pulse load has a more variable power usage (peak power), and may include items such as one or more traction drive motors of an electric vehicle, a radar, or a laser or microwave-based weapon (e.g., a directed-energy weapon or "DEW"). A traction drive motor, for example, may perform rapid acceleration during which additional voltage is needed on the DC bus 16, and may perform rapid deceleration, potentially in connection with regenerative braking, where excess voltage may be provided on the DC bus 16.

The electrical power system 10 also includes a motor drive circuit 18 that operates as a pulse width modulated inverter to cause a multiphase AC machine 20 to operate as a motor and drive a rotor 22 that drives one or more motor-driven loads 24 (e.g., an oil pump, an air compressor, an actuator, a cooling fan, an HVAC component, and/or a traction drive motor). The motor drive circuit 18 includes a plurality of switching legs 26A-C that are operated as a multiphase pulse width modulated inverter to convert DC power from the DC bus 16 to variable voltage variable frequency power supplied to a plurality of stator windings A2, B2, C2 of the multiphase AC motor 20.

The power generating section 12 also includes a battery 30 that is a lithium-ion battery in some non-limiting examples, and includes a battery charger 32 that is operable to charge the battery 30 from the DC bus 16 when connected to the battery 30. The power generating section 12 also includes a multiphase AC machine 34 that includes a plurality of windings A1, B1, C1 and is separate from the multiphase AC machine 20.

In one example, the AC machine 20 and/or the AC machine 34 are brushless machines, such as a permanent magnet synchronous machines (PMSMs), and the plurality of windings A1, B1, C1 and/or A2, B2, C2 are arranged in a wye formation. A PMSM uses rotating permanent magnets to provide an electrical field that induces a current in a plurality of stator windings. Of course, other types of AC machines could be used, such as ones that can operate as an axial flux machine, a wound field synchronous machine, or an induction machine, and other winding formations could be used as well.

The power generating section 12 includes a multifunctional converter circuit 40 that utilizes stator windings A1, B1, C1 of the multiphase AC machine 34 to act as a DC-DC boost converter or an active rectifier in different operating modes. The multifunctional converter 40 may also operate as an inverter to provide electric engine start. The multifunctional converter circuit 40 has a plurality of switching legs 42A-C, which are illustrated in more detail in FIG. 2. The multifunctional converter circuit 40 described below is a 2-level power converter that is well-known for use as an inverter. However, other topologies, such as multilevel power converter can also be utilized in this invention.

Figure 2:
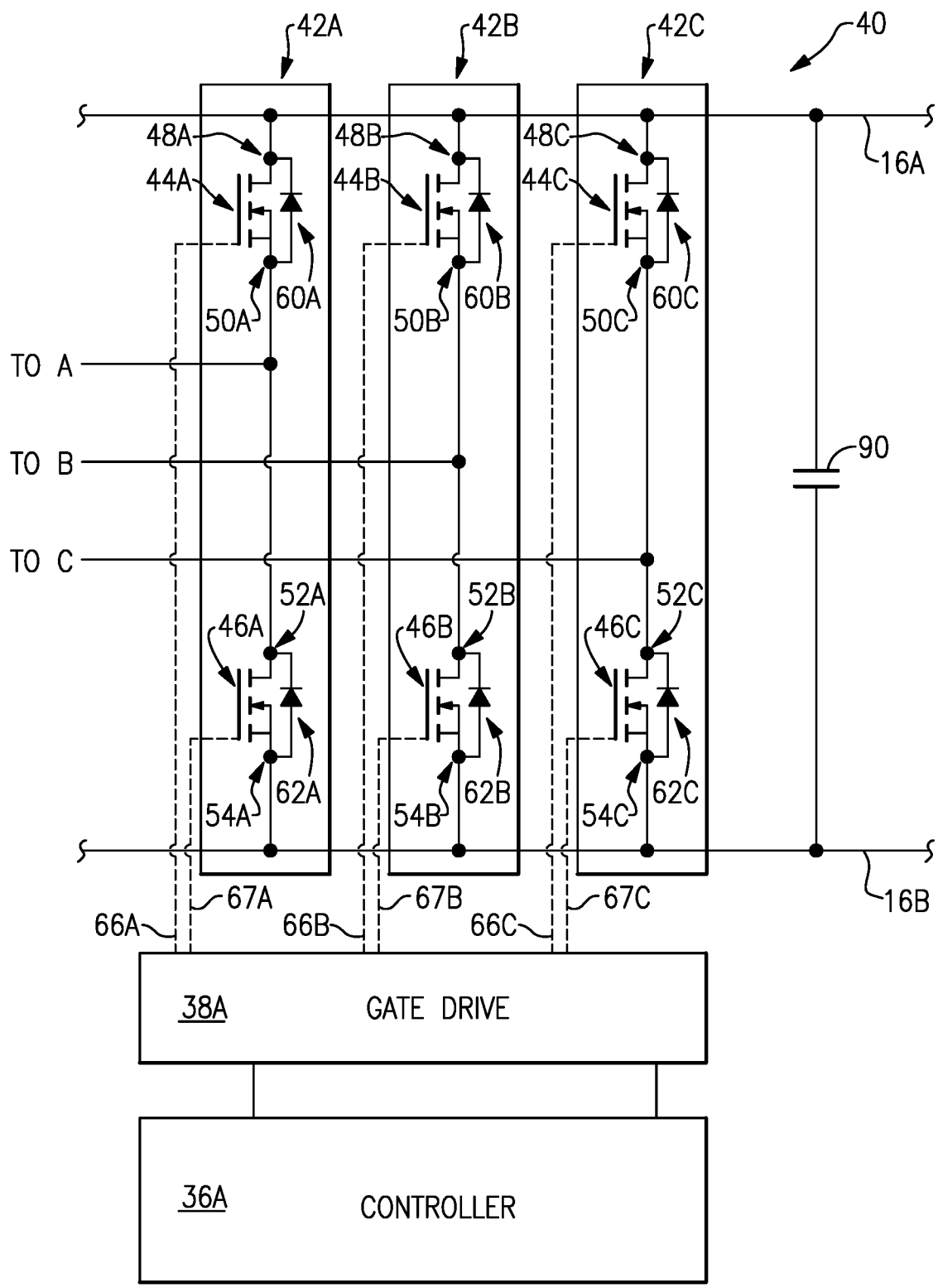
FIG. 2 is an enlarged view of a multifunctional converter circuit of the electrical power system of FIG. 1.

Referring now to FIG. 2, each switching leg 42 includes a pair of power switches 44 and 46, and controls connection of a respective one of the windings A1, B1, C1 of the AC machine 34 to the DC bus 16. The first power switch 44 has a first node 48 connected to the positive rail 16A of the DC bus 16 and also has a second node 50. The second power switch 46 has a first node 52 connected to the second node 50 of the first power switch 44, and also has a second node 54 connected to the negative rail 16B of the DC bus 16.

An output of each winding A1, B1, C1 is connected to the nodes 50, 52 of its respective switching leg 42. Each power switch 44 is connected in parallel to an associated freewheeling diode 60, and each power switch 46 is also connected in parallel to an associated freewheeling diode 62. The freewheeling diodes 60, 62 form a current path when their respective power switches 44, 46 are turned off.

A controller 36A operates its associated gate drive 38A to control the power switches 44, 46 over control lines 66A-C and 67A-C. Although the power switches 44, 46 are shown as being metal-oxide semiconductor field-effect transistors (MOSFETs) in FIG. 2, it is understood that other types of power switches could be used, such as insulated-gate bipolar transistors (IGBTs).

The switching legs 26A-C of the motor drive circuit 18 are arranged the same as the switching legs 42A-C of converter circuit 40 except that the switching legs 26A-C are connected to windings A2, B2, C2 instead of windings A1, B1, C1. Thus, each switching leg 26A-C includes a pair of power switches, and controls connection of a respective one of the windings A2, B2, C2 of the AC machine 20 to the DC bus 16. Each power switch of the switching legs 26A-C is also connected in parallel to a respective freewheeling diode. Although the power switches of the switching legs 26A-C are shown as being metal-oxide semiconductor field-effect transistors (MOSFETs) in FIG. 2, it is understood that other types of power switches could be used, such as insulated-gate bipolar transistors (IGBTs).

Referring again to FIG. 1, the battery 30 is connectable to three different circuit paths 72, 74, 76 for different operating modes of the power generating section 12. In a first "active rectification" mode, which uses circuit path 72, the multifunctional converter circuit 40 utilizes the plurality of windings A1, B1, C1 and functions as an active rectifier to supply DC power to the DC loads and to charge the battery 30 through the battery charger 32. In a second "boost converter" mode, which uses circuit path 76, the multifunctional converter circuit 40 utilizes the plurality of windings A1, B1, C1 and functions as a boost converter to supply DC power to the DC loads via DC bus 16 by converting a variable voltage of the battery 30 to a constant voltage on the DC bus 16. This is "silent" operation, when the vehicle prime mover engine 80 is turned off. In a third mode, which uses circuit path 74, the battery 30 is used to start the prime mover engine 80, prior to initiating the active rectification mode, by supplying DC power via DC bus 16 to the multifunctional converter circuit 40 operating as an inverter. These modes will now be discussed in greater detail.

Figure 3:
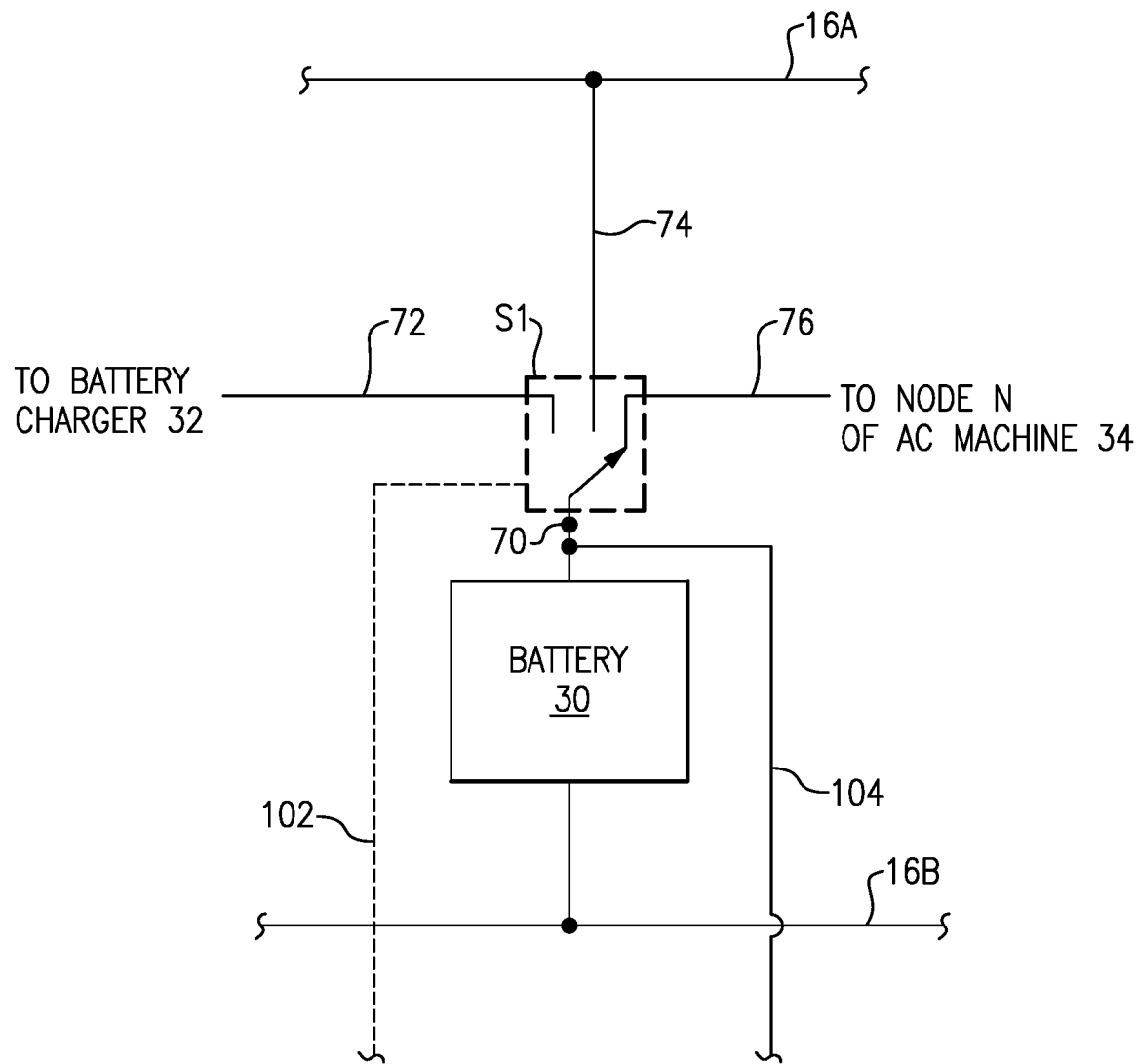
FIG. 3 is an enlarged view of a battery switching circuit of the electrical power system of FIG. 1.

FIG. 3 is an enlarged view of a battery switching circuit S1 of the electrical power system 10 that controls which one of the circuit paths 72, 74, 76 is connected to a node 70 of the battery 30. The switching circuit S1 includes a three position switch in some examples. Referring now to FIG. 3, in the first "active rectification" mode, the switching circuit S1 connects node 70 of the battery 30 to circuit path 72, which connects to battery charger 32 for charging the battery 30. The circuit path 72 excludes the plurality of windings A1, B1, C1. During the first mode, the prime mover engine 80 is running, and rotates rotor 82 which drives operation of the multiphase AC machine 34 to induce an electrical current in the plurality of windings A1, B1, and C1 and operate the multiphase AC machine 34 as a generator. The prime mover engine 80 is an internal combustion engine (e.g., diesel or gasoline) or a gas turbine engine in some examples. In one example, the prime mover engine 80 is a gas turbine engine, such as in a tank. The prime mover engine 80 uses fuel from a fuel source (not shown).

During the first mode, the controller 36A operates the plurality of switching legs 42A-C as a pulse width modulated active rectifier to rectify AC from the plurality of windings A1, B1, C1 to DC for the DC bus 16. The battery charger 32 uses the DC on the DC bus to charge the battery 30. During the first mode, the controller 36A utilizes a field oriented control using a known sensorless technique, optionally using a position sensor (not shown) for rotor 82.

The power generating section 12 can enter the first mode when the prime mover engine 80 is started and has reached a threshold speed. In the first mode, the controller 36A performs pulse width modulation on the switching legs 42A-C to operate the multifunctional converter circuit 40 as a pulse width modulated active rectifier. The active rectification mode can extend the range of an electric or hybrid vehicle using the battery 30, by charging the battery 30 when its charge is depleted. The plurality of windings A1, B1, C1 are operated as boost inductors during active rectifier operation in the first mode.

In the second "boost converter" mode, the switching circuit S1 connects the output node 70 of the battery 30 to a neutral N of the AC machine 34 through circuit path 76. During this mode, the controller 36A operates the multifunctional converter circuit 40 to utilize the plurality of windings A1, B1, C1 and function as a boost converter that converts an output voltage of the battery 30 to a controlled DC bus voltage on DC bus 16 at a specified voltage level during "silent" operation when the battery 30 voltage gradually reduces.

The prime mover engine 80 is not operating during the second mode, which in hybrid vehicles is known as a "silent mode" due to the quiet way in which traction motors run on battery power alone.

During the second mode, the controller 36A uses an interleaved technique by parallel connection of three channels of boost converters, with each "channel" corresponding to a current phase on a respective one of the windings A1, B1, C1. The controller 36A performs phase shifting of the pulse width modulation frequencies for each phase by 120° between channels. The interleaved technique reduces the total input and output current of the plurality of windings A1, B1, C1, and also significantly reduces input and output current ripple on the DC bus 16 and battery 30.

In the third mode, the battery 30 is connected to the DC bus 16 through current path 74. In this mode, the controller 36A operates the plurality of switching legs 42A-C of the multifunctional converter circuit 40 as a motor drive pulse-width modulated inverter that converts DC power from the battery 30, as received over the DC bus, to a variable voltage variable frequency power to the plurality of windings A1, B1, C1 (stator windings of AC machine 34). This operates the AC machine 34 in a motoring mode, to rotate rotor 82 and provide electric start of the prime mover engine 80. In one example, the controller 36A uses a field oriented motor control using a known sensorless technique. The controller 36A may optionally use a motor rotor position sensor (not shown) which is operable to detect a position of the rotor 82 of the prime mover engine 80 to perform the engine start in the third mode. In some examples, the battery 30 may be re-connected from the charger 32 to the DC bus 16 during active rectification mode if the battery is fully (or near fully) charged.

While the battery is directly connected to the DC bus 16 during the third mode (through circuit path 74), the battery is not directly connected to the DC bus 16 during the first and second modes, when the circuit paths 72 and 76, respectively, are used.

In the case of electric vehicles, the power generating section 12 enters the third mode when a charge of battery 30 is depleted beneath a charge level threshold, and the controller 36A needs to start the prime mover engine 80 from the battery 30 (e.g., as part of a range extender).

The multifunctional converter circuit 40 also includes a DC link capacitor 90 that is connected across the DC bus 16 in parallel to the various switching legs 42, 26. The DC link capacitor 90 reduces DC bus voltage ripple and helps to stabilize the power generating system in presence of constant power (negative impedance) loads.

The switching legs 26A-C of motor drive circuit 18 are operated in a similar fashion to how the switching legs 42A-C of converter circuit 40 are operated during the third mode. In particular, the plurality of switching legs 26A-C of motor drive circuit 18 are operated as a pulse width modulated inverter to provide AC to the plurality of windings A2, B2, C2 to drive rotor 22. The controller 36B operates its associated gate drive 38B to control the switching legs 26A-C in this fashion.

The electrical power system 10 includes a plurality of lines 100-116 used by the controllers 36A and/or 36B for controlling and/or sensing in the electrical power system 10. Lines 100, 108 are used to detect and/or measure a voltage on the DC bus 16. Control line 102 is used for controlling an operational state of switching circuit S1. Lines 104, 108 are used to measure a voltage of the battery 30.

Sensing line 106 is used to detect and/or measure electrical current of the windings A1, B1, C1 from current sensors 107A, 107B, 107C. Although a single current sensing line 106 is schematically shown, it is understood that each winding A1, B1, C1 may have its own current sensing line 106. Lines 110, 112 are used to detect and/or measure voltage of the DC bus 16 (redundant sensing of DC bus 16). Sensing line 114 is used to detect and/or measure an electrical current of the windings A2, B2, C2 from current sensors 115A, 115B, 115C. Although a single current sensing line 114 is schematically shown, it is understood that each winding A2, B2, C2 may have its own current sensing line 115. Control line 116 is used to detect a temperature of the AC machine 20 and/or its rotor 22. Additional sensing lines (not shown) may be included to detect the rotational positions of rotors 22, 82.

In the example of FIG. 1, the controllers 36A-B are powered by an interface circuit 120 that may also communicate with other vehicle controls (not shown). The interface circuit 120 obtains its power from power circuit 122. In one example, the power circuit 122 provides 28 volt DC power to the interface circuit 120.

Figure 4:
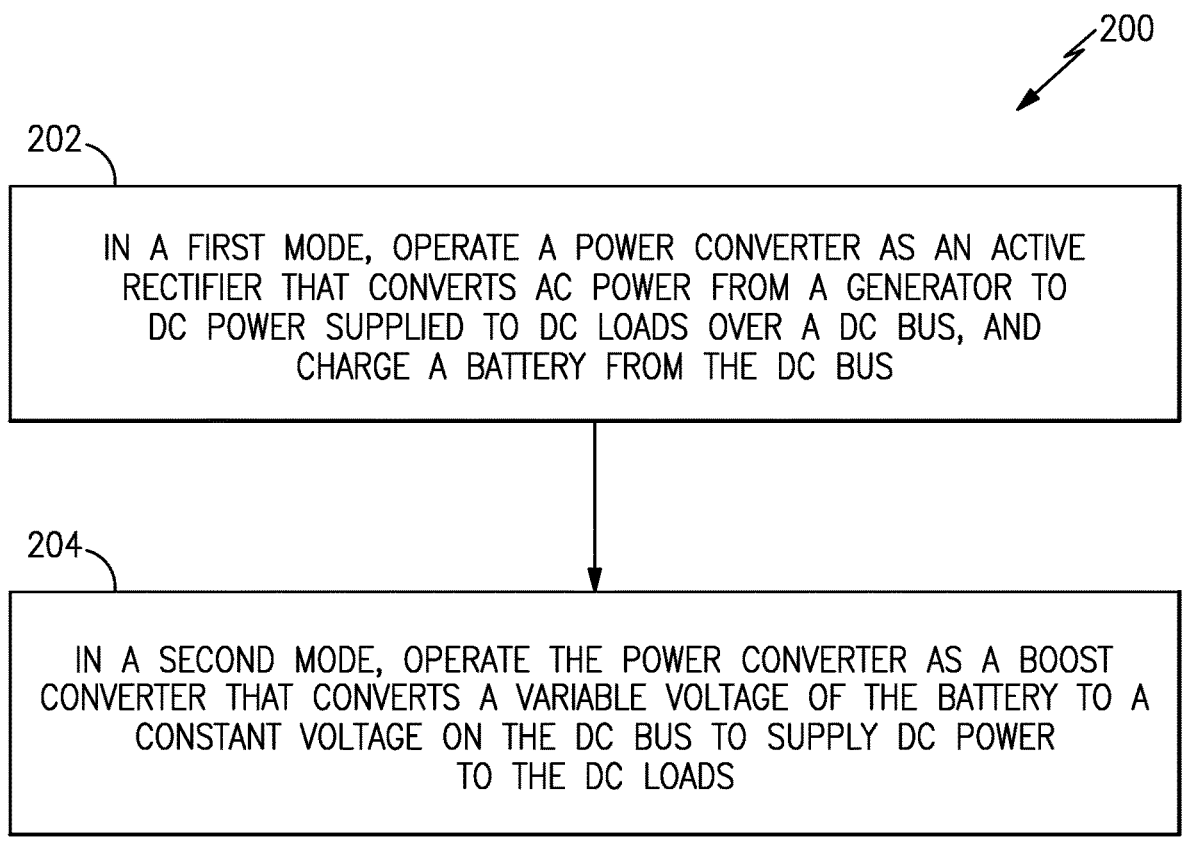
FIG. 4 is flowchart of an example method of operating an electrical power system for a vehicle.

FIG. 4 illustrates an example method 200 of operating the electrical power system 10. In the first mode, a power converter (e.g., that includes multifunctional converter circuit 40 and controller 36A) is operated as an active rectifier that converts AC power from a generator (e.g., AC machine 34 operating as a generator) to DC power supplied to DC loads 14 over DC bus 16, and charge battery 30 from the DC bus 16 (block 202). As discussed above, in the first mode, circuit path 72 is used. In the second mode, the power converter is operated as a boost converter that converts a variable output voltage of the battery 30 to a specified constant voltage on the DC bus 16 to supply DC power to the DC loads 14 (block 204). The power converter utilizes the plurality of windings A1, B1, C1 of multiphase AC machine 34 when operated as the active rectifier and boost converter. As discussed above, in the second mode, circuit path 76 is used. Also, as discussed above, circuit path 74 is used during the third mode, in which battery 30 powers the multifunctional converter circuit 40 via DC bus to supply variable voltage variable frequency power to the stator windings A1, B1, C1 of the AC machine to start the prime mover engine 80.

The electrical power system 10 provides an improved and simplified architecture that eliminates the additional DC-DC boost converter typically present in prior art systems. This provides a weight, volume, and cost reduction, and can also reduce electromagnetic interference (EMI). The improved architecture can also simplify thermal management and provide increased reliability through elimination of the additional DC-DC boost converter, because eliminating the additional DC-DC boost converter can also facilitate elimination of a dedicated thermal management system of the eliminated boost converter.

Although a three phase system has been described above that includes three windings in each of the AC machines 20, 34, and three switching legs in each of motor drive circuit 18 and converter circuit 40, it is understood that this is only an example and that other quantities of phases could be used if desired (e.g., more than three or less than three).

Also, although only one AC machine 20 is shown for driving the one or more motor-driven loads 24, it is understood that the outputs of motor drive circuit 18 could be used to drive a plurality of AC machines 20 for a plurality of motor-driven loads 24.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A vehicle electrical power system comprising:
   a battery operable to power a load of a vehicle over a direct current (DC) bus;
   a multiphase alternating current (AC) machine comprising a plurality of windings; and
   a power converter comprising a plurality of power switches and a controller, wherein the controller is configured to:
   in a first mode, operate the power converter as an active rectifier that provides current to the DC bus to supply DC loads, and charge the battery from the current on the DC bus; and
   in a second mode, operate the power converter as a boost converter that converts a variable voltage of the battery to a constant voltage on the DC bus;
   wherein the power converter utilizes the plurality of windings of the AC machine when operated as active rectifier and boost converter.

2. The vehicle electrical power system of claim 1, wherein the controller is configured to:
   in the second mode, power the DC bus by connecting a node of the battery to the DC bus through the plurality of windings and the power converter.

3. The vehicle electrical power system of claim 2, wherein to connect the node of the battery to the DC bus through the plurality of windings and the power converter in the second mode, the controller is configured to connect the node of the battery to a neutral of the AC machine.

4. The vehicle electrical power system of claim 2, wherein the controller is configured to:

in the first mode, connect the node of the battery to a node of a battery charger that is powered by the DC bus.

5. The vehicle electrical power system of claim 2, wherein the plurality of power switches are arranged in a plurality of switching legs, and wherein each switching leg comprises a pair of power switches and controls connection of a respective one of the plurality of windings to the DC bus.

6. The vehicle electrical power system of claim 5, wherein the controller is configured to:
operate the plurality of switching legs of the power converter as a pulse width modulated active rectifier during the first mode; and
to operate the plurality of switching legs of the power converter as the boost converter in the second mode, such that the same plurality of switching legs are used for both active rectifier and boost converter operation.

7. The vehicle electrical power system of claim 5:
wherein the DC bus comprises a positive rail and a negative rail;
wherein each pair of power switches comprises:
a first power switch having a first node connected to the positive rail of the DC bus, and a second node; and
a second power switch having a first node connected to the second node of the first power switch, and second node connected to the negative rail of the DC bus; and
wherein an output of each winding is connected to the second node of the first power switch and the first node of the second power switch of its respective switching leg.

8. The vehicle electrical power system of claim 7, wherein during the second mode, the controller is configured to:
connect the node of the battery to a neutral node of the plurality of windings; and
perform pulse width modulation on the second power switch of each switching leg while the first power switch of each switching leg is turned off.

9. The vehicle electrical power system of claim 5, comprising:
a prime mover engine, the AC machine driven by the prime mover engine to induce a voltage in the plurality of windings during the first mode while the prime mover engine is running;
wherein to transition to the first mode, the controller is configured to, while the node of the battery is connected to the DC bus along a circuit path that excludes the plurality of windings, operate the power converter as an inverter that converts DC power from the battery on the DC bus to variable voltage variable frequency AC power to start the prime mover engine.

10. The vehicle electrical power system of claim 9, wherein the controller is configured to stop the prime mover engine to enter the second mode.

11. The vehicle electrical power system of claim 5, comprising:
an additional multiphase AC machine comprising a plurality of additional windings operable to power one or more motor-driven loads; and
an additional power converter comprising a plurality of additional switching legs, each additional switching leg comprising a pair of power switches that controls connection of a respective one of the additional windings to the DC bus;
wherein the controller is configured to operate the additional converter circuit as a pulse width modulated inverter to power the additional multiphase AC machine from the DC bus.

12. A method of operating a vehicle electrical power system comprising:
in a first mode, operating a power converter as an active rectifier that provides current to a DC bus to power DC loads, and charging a battery from the current on the DC bus; and
in a second mode, operating the power converter as a boost converter that converts a variable voltage of the battery to a constant voltage on the DC bus;
wherein the power converter comprises a plurality of power switches, and utilizes a plurality of windings of a multiphase alternating current (AC) machine when operated as the active rectifier and boost converter.

13. The method of claim 12, comprising:
in the second mode, powering the DC bus by connecting a node of the battery to the DC bus through the plurality of windings and the power converter.

14. The method of claim 13, wherein connecting the node of the battery to the DC bus through the plurality of windings and the power converter in the second mode comprises connecting the node of the battery to a neutral of the AC machine.

15. The method of claim 13, comprising:
in the first mode, connecting the node of the battery to a node of a battery charger that is powered by the DC bus.

16. The method of claim 13:
wherein the plurality of power switches are arranged into a plurality of switching legs, each switching leg comprising a pair of power switches, and each switching leg corresponding to one of the plurality of windings;
the method comprising controlling connection of the plurality of windings to the DC bus by operating the switching legs.

17. The method of claim 16, comprising:
operating the plurality of switching legs of the power converter as a pulse width modulated active rectifier during the first mode, and
operating the plurality of switching legs of the power converter as the boost converter in the second mode, such that the same plurality of switching legs are used for both active rectifier and boost converter operation.

18. The method of claim 16, comprising, during the second mode:
connecting the node of the battery to a neutral node of the plurality of windings; and
performing pulse width modulation on a first group of the power switches while a different, second group of the power switches are turned off.

19. The method of claim 16:
wherein operating the plurality of windings of the multiphase AC motor as an active rectifier during the first mode comprises operating a prime mover engine to rotate a rotor of the multiphase AC machine and operate the multiphase AC machine as a generator; and
the method comprising transitioning to the first mode by:
operating the power converter as an inverter that converts DC power from the battery on the DC bus to variable voltage variable frequency (VVVF) AC power; and
starting the prime mover engine with the VVVF AC power.

20. The method of claim 19, comprising stopping the prime mover engine to enter the second mode.

* * * * *